(12) United States Patent
Otsuki et al.

(10) Patent No.: US 11,286,940 B2
(45) Date of Patent: Mar. 29, 2022

(54) PUMP DEVICE

(71) Applicant: NIDEC SANKYO CORPORATION, Nagano (JP)

(72) Inventors: Noboru Otsuki, Nagano (JP); Hiroki Kuratani, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 402 days.

(21) Appl. No.: 16/271,894

(22) Filed: Feb. 11, 2019

(65) Prior Publication Data

US 2019/0249672 A1    Aug. 15, 2019

(30) Foreign Application Priority Data

Feb. 14, 2018 (JP) .............................. JP2018-023707
Nov. 27, 2018 (JP) .............................. JP2018-221516

(51) Int. Cl.
*F04D 13/06* (2006.01)
*F04D 29/041* (2006.01)
*F16C 17/08* (2006.01)

(52) U.S. Cl.
CPC ........... *F04D 13/06* (2013.01); *F04D 29/041* (2013.01); *F16C 17/08* (2013.01)

(58) Field of Classification Search
CPC .. F04D 13/06; F04D 13/0606; F04D 13/0633; F04D 13/0673; F04D 29/041; F16C 17/04; F16C 17/08; F16C 2226/50–2226/80; F16C 33/08; F16C 35/02; F16C 2360/42–46
See application file for complete search history.

(56) References Cited

U.S. PATENT DOCUMENTS

| | | | |
|---|---|---|---|
| 4,557,610 A | * | 12/1985 | Asada .................... F16C 17/02 384/107 |
| 2011/0037332 A1 | * | 2/2011 | Neuroth .................. F16C 17/18 310/87 |

FOREIGN PATENT DOCUMENTS

| | | |
|---|---|---|
| CN | 101860111 | 10/2010 |
| CN | 102072169 | 5/2011 |
| CN | 209671224 | 11/2019 |
| JP | H0988868 | 3/1997 |

(Continued)

OTHER PUBLICATIONS

"Office Action of China Counterpart Application", dated Apr. 16, 2020, with English translation thereof, p. 1-p. 18.

*Primary Examiner* — Philip E Stimpert
(74) *Attorney, Agent, or Firm* — JCIPRNET

(57) ABSTRACT

A pump device is provided. In the pump device, a bottom portion of a case body with a suction port formed therein is provided with a through-hole through which a fluid sucked through the suction port passes, and the case body is provided with a shaft holding portion holding the lower end of the fixed shaft and a plurality of connection portions disposed with a space interposed therebetween in the circumferential direction of the rotor so as to surround the through-hole and connecting the shaft holding portion and the bottom portion. The upper end side of the connection portion is provided with a protrusion protruding upward beyond the upper end surface of the shaft holding portion, and at least one of the protrusions is a rotation preventing portion that prevents rotation of the thrust bearing in the circumferential direction of the rotor.

9 Claims, 9 Drawing Sheets

(56) References Cited

FOREIGN PATENT DOCUMENTS

JP  2010007642      1/2010
JP  2010007642 A  * 1/2010

* cited by examiner ent content of which is incorporated# PUMP DEVICE

CROSS REFERENCE TO RELATED APPLICATION

The present application claims priority under 35 U.S.C. § 119 to Japanese Application No. 2018-023707 filed Feb. 14, 2018, and Japanese Application No. 2018-221516 filed Nov. 27, 2018, and the entire content of which is incorporated herein by reference.

BACKGROUND

Technical Field

The present disclosure relates to a pump device including a motor and an impeller configured to be rotated by a power of the motor.

Description of the Related Documents

Conventionally, there is known a pump device that includes: a motor including a rotor and a stator; and an impeller that is secured to the rotor (for example, see Japanese Laid-open Patent Publication No. 2010-7642). The exterior of the pump device disclosed in Japanese Laid-open Patent Publication No. 2010-7642 is composed of: a housing formed in a cylindrical shape with a bottom and covering the stator; and a case body covering the opening side of the housing. A pump chamber, through which a fluid passes, is formed between the housing and the case body. The motor includes a fixed shaft that rotatably supports the rotor. One end of the fixed shaft is held by the case body, and the other end of the fixed shaft is held by the housing.

In the pump device disclosed in Japanese Laid-open Patent Publication No. 2010-7642, thrust bearings supporting the rotor in the axial direction of the fixed shaft are attached to both ends of the fixed shaft. A sleeve forming part of the rotor is disposed between the two thrust bearings. D-cut processing is performed on both ends of the fixed shaft so that the cross-sectional shape of the two ends of the fixed shaft is a D-shape. That is, both ends of the fixed shaft are D-cut surface formed portions where a D-cut surface is formed. The length (the length in the axial direction of the fixed shaft) of the D-cut surface formed portion formed at one end of the fixed shaft is longer than the length (the length in the axial direction of the fixed shaft) of the D-cut surface formed portion formed at the other end of the fixed shaft.

Furthermore, in the pump device disclosed in Japanese Laid-open Patent Publication No. 2010-7642, the thrust bearing is provided with a fixed-shaft insertion hole through which the D-cut surface formed portion is inserted. On the inner circumference of the fixed-shaft insertion hole, a plain surface opposed to the D-cut surface is formed, and the plain surface formed on the inner circumference of the fixed-shaft insertion hole and the D-cut surface formed on the fixed shaft prevent rotation of the thrust bearing relative to the fixed shaft. Furthermore, by preventing rotation of the thrust bearing relative to the fixed shaft, corotation of the thrust bearing in accordance with rotation of the rotor is prevented.

Furthermore, in the pump device disclosed in Japanese Laid-open Patent Publication No. 2010-7642, the case body is formed in a cylindrical shape having a bottom with an opening formed at the side of the housing, and it includes a cylindrical portion formed in a cylindrical shape; and a bottom portion covering one end of the cylindrical portion. In the case body formed an introduction port through which a fluid flows in and a discharge port through which a fluid is discharged. The end of the introduction port is a suction port of a fluid. The introduction port is arranged at the center of the bottom portion. Furthermore, the introduction port is arranged at the same axis as that of the fixed shaft. Moreover, the case body is provided with a shaft holding portion that holds one end of the fixed shaft. The shaft holding portion is integrally formed with the bottom portion, and it connects to the center part of the bottom portion.

In the pump device disclosed in Japanese Laid-open Patent Publication No. 2010-7642, D-cut processing is performed on both ends of the fixed shaft to prevent rotation of the thrust bearing relative to the fixed shaft and prevent corotation of the thrust bearing in accordance with rotation of the rotor. Specifically, in the pump device disclosed in Japanese Laid-open Patent Publication No. 2010-7642, D-cut processing is performed on part of the two end sides of the fixed shaft formed in an elongated cylindrical shape. Thus, in the pump device disclosed in Japanese Laid-open Patent Publication No. 2010-7642, the fixed shaft is expensive.

SUMMARY

Hence, the present disclosure provides a pump device that includes a rotor; an impeller secured to the rotor; a fixed shaft rotatably supporting the rotor and the impeller; and a thrust bearing supporting the rotor and the impeller in the axial direction of the fixed shaft and that is capable of reducing costs of the fixed shaft, while it is capable of preventing corotation of the thrust bearing in accordance with rotation of the rotor.

To solve the above-described problem, the pump device according to the present disclosure includes: a motor, having a rotor and a stator; and an impeller, fixed to the rotor and configured to be rotated by a power of the motor. A pump chamber through which a fluid sucked from a suction port passes toward a discharge port is provided inside a pump case. The rotor, the stator and the impeller are housed in the pump case. The motor includes: a fixed shaft, rotatably supporting the rotor and the impeller; and a thrust bearing, when one side in an axial direction of the fixed shaft is a first direction and a direction opposite to the first direction is a second direction, the thrust bearing is disposed on an end side of the fixed shaft in the first direction to have the fixed shaft inserted therethrough, and the thrust bearing supports the rotor and the impeller in the axial direction of the fixed shaft. The pump case includes a case body provided with the suction port. The case body is formed in a cylindrical shape with a bottom, and the case body including: a cylindrical portion formed in a cylindrical shape and a bottom portion covering one end of the cylindrical portion. An axial direction of the cylindrical portion formed in a cylindrical shape coincides with the axial direction of the fixed shaft. The bottom portion covers an end of the cylindrical portion in the first direction. The bottom portion is provided with a through-hole penetrating the bottom portion in the axial direction of the fixed shaft and allowing passage of the fluid sucked through the suction port. An axis center of the fixed shaft coincides with a center of the through-hole when viewed in the axial direction of the fixed shaft. The case body is provided with a shaft holding portion disposed at a side of the bottom portion in the second direction to hold an end of the fixed shaft in the first direction and a plurality of connection portions disposed with a space interposed therebetween in a circumferential direction of the rotor to surround the through-hole and connects the shaft holding portion and the bottom portion. After passing through the through-hole, the fluid flows into the pump chamber between the connection portions in the circumferential direction of the rotor. End sides of at least the two connection portions in the second direction are provided with protrusions that protrude in the second direction beyond an end surface of the shaft holding portion at a side in the second direction. The thrust bearing is disposed at a side of the shaft holding portion in the second direction, and at least part of the thrust bearing is located inside the protrusion in a radial direction of the rotor, and at least one of the protrusions is a rotation preventing portion that prevents rotation of the thrust bearing in the circumferential direction of the rotor.

In the pump device according to the present disclosure, the bottom portion of the case body with the suction port formed therein is provided with the through-hole through which a fluid sucked through the suction port passes, and the case body is provided with the shaft holding portion holding an end of the fixed shaft in the first direction and the connection portions disposed with a space interposed therebetween in the circumferential direction of the rotor to surround the through-hole and connect the shaft holding portion and the bottom portion. Furthermore, according to the present disclosure, end sides of at least the two connection portions in the second direction are provided with protrusions that protrude in the second direction beyond the end surface of the shaft holding portion at the side in the second direction. Furthermore, according to the present disclosure, the thrust bearing is disposed at the side of the shaft holding portion in the second direction, at least part of the thrust bearing is located inside the protrusion in a radial direction of the rotor, and at least one of the protrusions is a rotation preventing portion that prevents rotation of the thrust bearing in the circumferential direction of the rotor.

Therefore, according to the present disclosure, the use of the rotation preventing portion formed at the connection portion of the case body may prevent rotation of the thrust bearing even though D-cut processing is not performed on at least an end side of the fixed shaft in the first direction. Thus, according to the present disclosure, it is possible to reduce costs of the fixed shaft while it is possible to prevent corotation of the thrust bearing in accordance with rotation of the rotor. Furthermore, according to the present disclosure, the use of the connection portion connecting the shaft holding portion and the bottom portion prevents corotation of the thrust bearing in accordance with rotation of the rotor, and therefore it is not necessary to provide a separate member to prevent corotation of the thrust bearing. Thus, according to the present disclosure, the configuration of the pump device may be simplified.

According to the present disclosure, for example, the thrust bearing is provided with a first projection and a second projection projecting toward an outer circumference side of the thrust bearing. The first projection is provided with a first contact surface that is capable of being in contact with the rotation preventing portion at one side in the circumferential direction of the rotor, and the second projection is provided with a second contact surface that is capable of being in contact with the rotation preventing portion at the other side in the circumferential direction of the rotor. In this case, the use of the first projection and the second projection projecting to the outer circumference side of the thrust bearing makes it possible to ensure that corotation of the thrust bearing in accordance with rotation of the rotor is prevented. Furthermore, in this case, the thrust bearing is easily assembled at the side of the shaft holding portion in the second direction by using the first projection and the second projection as marks when the pump device is assembled.

According to the present disclosure, for example, one of the protrusions is the rotation preventing portion, and the rotation preventing portion is sandwiched between the first projection and the second projection in the circumferential direction of the rotor.

According to the present disclosure, it is preferable that an end side of the protrusion in the second direction is provided with a removal preventing portion that prevents the thrust bearing from being removed to a side in the second direction. With this configuration, it is possible to prevent the thrust bearing secured to the case body from being removed from the case body. Therefore, the thrust bearing is easily handled when the pump device is assembled. Furthermore, as it is ensured that the thrust bearing is disposed at the side of the shaft holding portion in the second direction when the pump device is assembled, it is possible to prevent improper assembly such as not installing the thrust bearing at the side of the shaft holding portion in the second direction when the pump device is completed.

According to the present disclosure, it is preferable that the motor includes: a second thrust bearing, disposed on an end side of the fixed shaft in the second direction to have the fixed shaft inserted therethrough, and the second thrust bearing supports the rotor and the impeller in the axial direction of the fixed shaft. The pump case includes: a motor case that forms part of the motor. The motor case is provided with a second shaft holding portion that holds an end of the fixed shaft in the second direction, and the second shaft holding portion is provided with a second rotation preventing portion that prevents rotation of the second thrust bearing in the circumferential direction of the rotor.

With this configuration, the use of the second rotation preventing portion formed in the second shaft holding portion of the pump case may prevent rotation of the second thrust bearing even though D-cut processing is not performed on the end side of the fixed shaft in the second direction. That is, corotation of the thrust bearing and the second thrust bearing in accordance with rotation of the rotor may be prevented even though D-cut processing is not performed on both end sides of the fixed shaft. Therefore, it is possible to reduce costs of the fixed shaft while it is possible to prevent corotation of the thrust bearing and the second thrust bearing in accordance with rotation of the rotor. Furthermore, with this configuration, as the use of the second shaft holding portion holding the end of the fixed shaft in the second direction prevents corotation of the second thrust bearing in accordance with rotation of the rotor, it is not necessary to provide a separate member to prevent corotation of the second thrust bearing. Thus, the configuration of the pump device may be simplified.

Furthermore, with this configuration, the fixed shaft formed in a simple elongated cylindrical shape is usable as D-cut processing does not need to be performed on both end sides of the fixed shaft. Therefore, it is possible to prevent improper assembly, such as improper direction of the fixed shaft attached, during assembly of the pump device. In the pump device disclosed in Japanese Laid-open Patent Publication No. 2010-7642, as the length of the D-cut surface formed portion formed at one end side of the fixed shaft is different from the length of the D-cut surface formed portion formed at the other end side of the fixed shaft, improper assemby, such as improper direction of the fixed shaft attached, may occur during assembly of the pump device. Furthermore, in the pump device disclosed in Japanese Laid-open Patent Publication No. 2010-7642, to prevent improper assemby, such as improper direction of the fixed shaft attached, the length of the D-cut surface formed portion formed at one end side of the fixed shaft may be the same as the length of the D-cut surface formed portion formed at the other end side of the fixed shaft; however, in this case, as the lengths of the D-cut surface formed portions at both end sides of the fixed shaft need to be the same, the flexibility in design of the pump device is reduced.

According to the present disclosure, it is preferable that the impeller includes: a shaft bearing with a cylindrical shape through which the fixed shaft is inserted, an end surface of the shaft bearing at the side in the first direction is opposed to the thrust bearing, and the end surface of the shaft bearing at the side in the first direction is provided with a communicating groove that communicates from an inner circumference of the shaft bearing to an outer circumference thereof and is recessed toward a side in the second direction.

With this configuration, when the impeller is rotated, a fluid flows through the communicating groove from the inner circumference of the shaft bearing toward the outer circumference thereof due to a centrifugal force; therefore, the use of a small gap formed between the outer circumference of the fixed shaft and the inner circumference of the shaft bearing and the communicating groove formed on the end surface of the shaft bearing at the side in the first direction allows a fluid flow path to be formed between the end side of the fixed shaft in the second direction and the end side thereof in the first direction. Therefore, a fluid membrane may be formed between the outer circumference of the fixed shaft and the inner circumference of the shaft bearing and, as a result, abrasion to the fixed shaft and abrasion to the inner circumference of the shaft bearing may be reduced. Furthermore, as a fluid flows through the communicating groove from the inner circumference of the shaft bearing toward the outer circumference thereof due to a centrifugal force, a fluid membrane may be formed between the end surface of the shaft bearing at the side in the first direction and the thrust bearing. Therefore, abrasion to the end surface of the shaft bearing at the side in the first direction and abrasion to the thrust bearing may be reduced.

According to the present disclosure, the rotation preventing portion is provided with an engagement protruding portion that bulges toward an inner side in the radial direction of the rotor, and the thrust bearing is provided with an engagement recessed portion that is engaged with the engagement protruding portion to prevent rotation of the thrust bearing in the circumferential direction of the rotor.

According to the present disclosure, for example, the motor includes: a second thrust bearing, disposed on an end side of the fixed shaft in the second direction to have the fixed shaft inserted therethrough, and the second thrust bearing supports the rotor and the impeller in the axial direction of the fixed shaft. The pump case includes: a motor case that forms part of the motor. The motor case is provided with a second shaft holding portion that holds an end of the fixed shaft in the second direction. The second shaft holding portion is provided with a placement recessed portion that is recessed toward a side in the second direction and has the second thrust bearing placed therein. A side surface of the placement recessed portion is provided with a second engagement protruding portion that bulges toward an inner side in the radial direction of the rotor. The second thrust bearing is formed to have the shape identical to the shape of the thrust bearing, and the second thrust bearing is provided with a second engagement recessed portion that is engaged with the second engagement protruding portion to prevent rotation of the second thrust bearing in the circumferential direction of the rotor. In this case, as the second thrust bearing is formed to have the shape identical to the shape of the thrust bearing, costs of the pump device may be reduced.

According to the present disclosure, it is preferable that the second engagement protruding portions are formed at equal to or more than three areas at a pitch of the equal angle with respect to the axis center of the fixed shaft. With this configuration, when the second engagement recessed portion is not engaged with the second engagement protruding portion, the entire second thrust bearing is located at the side in the first direction as compared with its placement position in design in the axial direction of the fixed shaft. Therefore, the rotational load of the rotor may be high when the second engagement recessed portion is not engaged with the second engagement protruding portion and, as a result, the pump device with the second thrust bearing installed at an improper position may be found during examination after the pump device is assembled. Furthermore, when the second engagement protruding portion is formed at one area, for example, the second thrust bearing is arranged in a tilted state due to disengagement between the second engagement protruding portion and the second engagement recessed portion; thus, even when the second engagement recessed portion is not engaged with the second engagement protruding portion, the rotational load of the rotor is less likely to be high.

According to the present disclosure, it is preferable that the second engagement protruding portions are formed at three areas with a pitch of the equal angle with respect to the axis center of the fixed shaft and the second engagement recessed portions are formed at six or nine areas with a pitch of the equal angle with respect to the axis center of the fixed shaft. With this configuration, when the second thrust bearing is placed in the placement recessed portion, the second engagement recessed portion is easily engaged with the second engagement protruding portion. Therefore, the second engagement recessed portion may be easily engaged with the second engagement protruding portion even though, for example, the placement recessed portion is recessed to a large degree.

As described above, according to the present disclosure, with the pump device including the rotor, the impeller secured to the rotor, the fixed shaft rotatably supporting the rotor and the impeller, and the thrust bearing supporting the rotor and the impeller in the axial direction of the fixed shaft, costs of the fixed shaft may be reduced while corotation of the thrust bearing in accordance with rotation of the rotor may be prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

With reference to drawings, an embodiment of the present disclosure is explained below.

(Overall Configuration of Pump Device)

Figure 1:
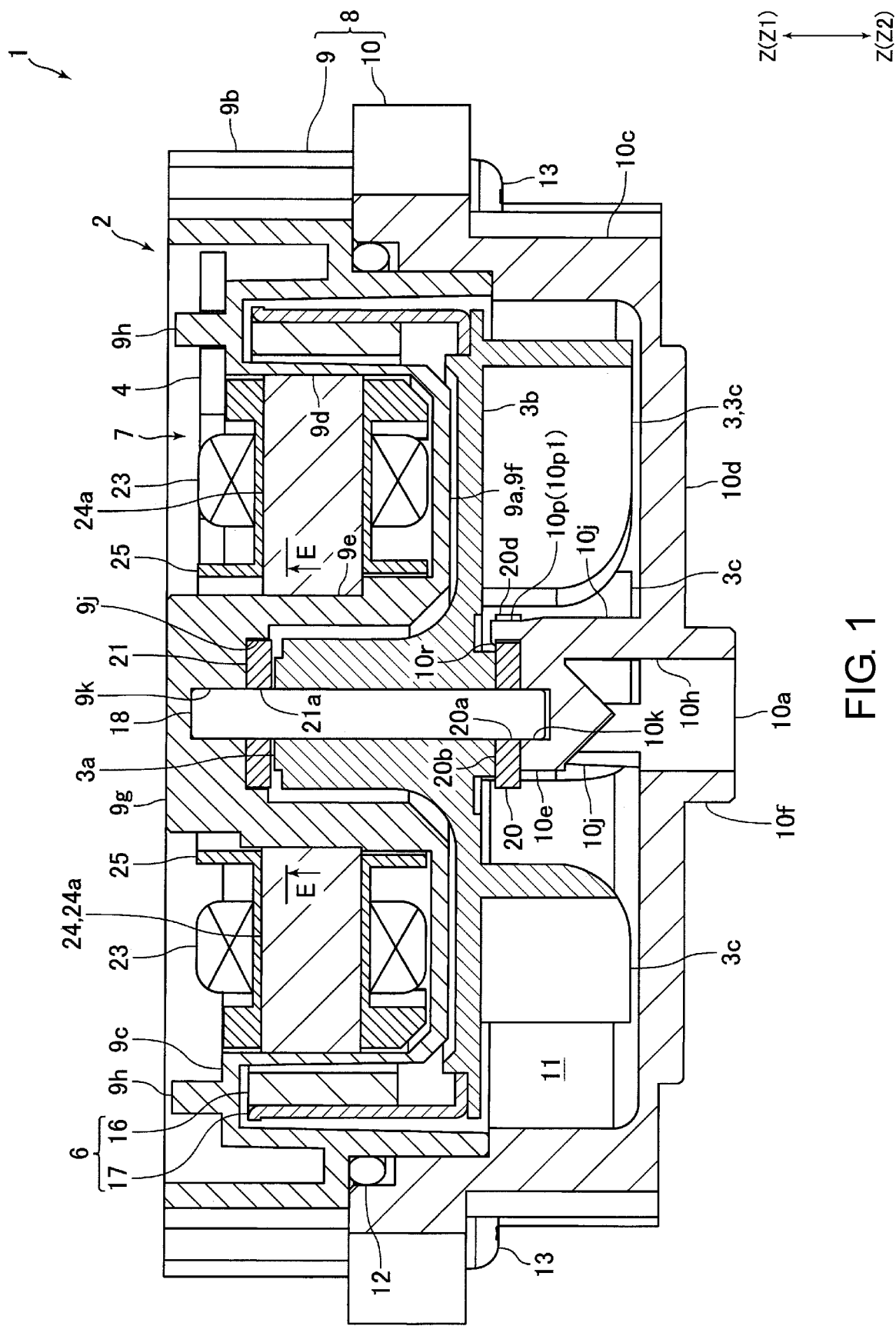
FIG. 1 is a cross-sectional view of a pump device according to an embodiment of the present disclosure.
Figure 2:
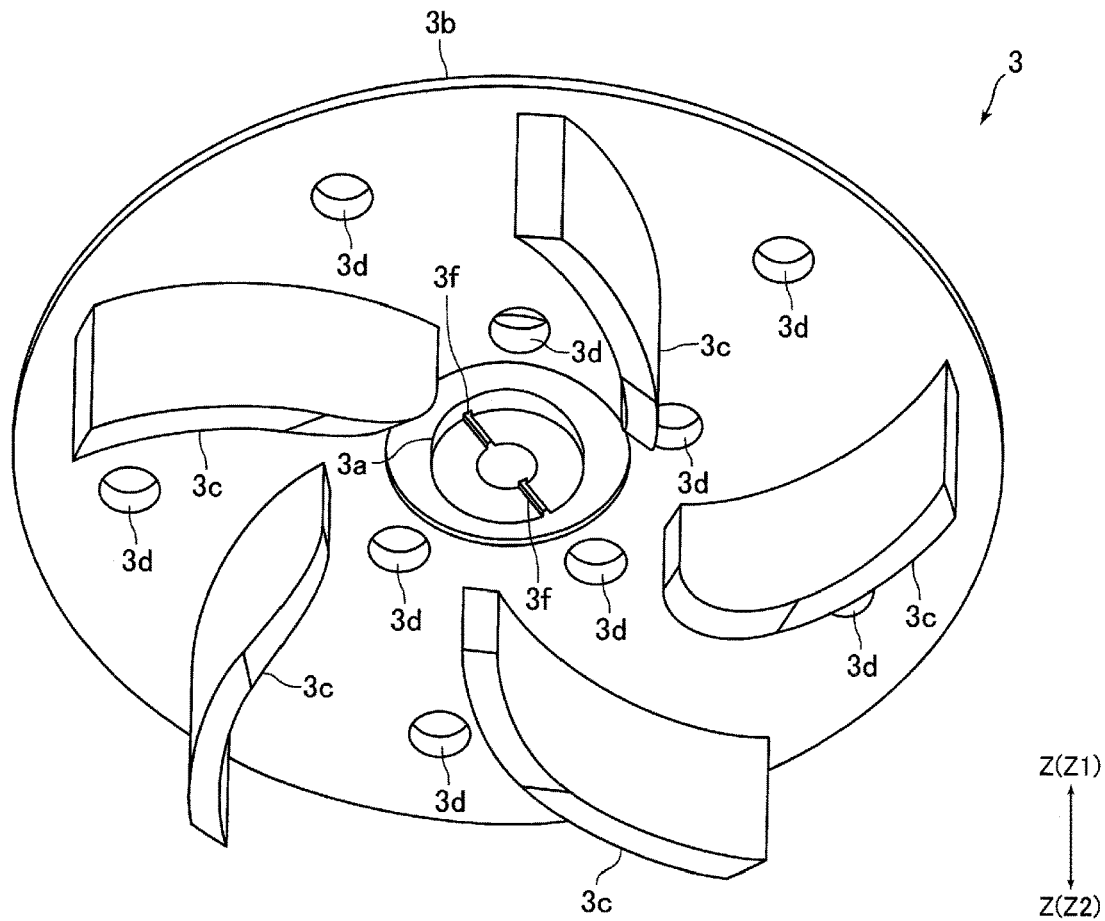
FIG. 2 is a perspective view of an impeller illustrated in FIG. 1.
Figure 3:
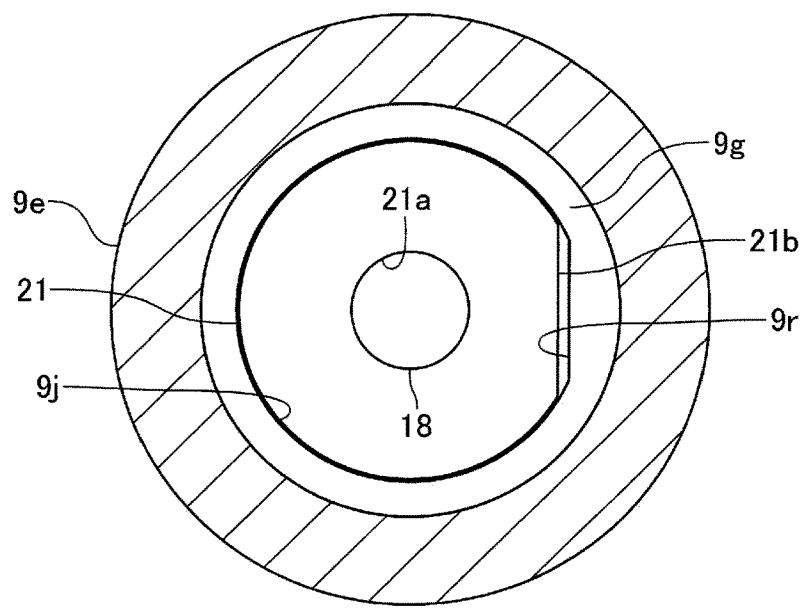
FIG. 3 is a diagram that illustrates configurations of a second thrust bearing and a placement recessed portion in the direction E-E of FIG. 1.

FIG. 1 is a cross-sectional view of a pump device 1 according to an embodiment of the present disclosure. FIG. 2 is a perspective view of an impeller 3 illustrated in FIG. 1. FIG. 3 is a diagram that illustrates configurations of a thrust bearing 21 and a placement recessed portion 9j in the direction E-E of FIG. 1. In the following explanation, the Z direction in FIG. 1 is a "vertical direction". Furthermore, the side in a Z1 direction, which is one side in the vertical direction, in FIG. 1 is an "upper" side, and the opposite side, i.e., the side in a Z2 direction in FIG. 1 is a "lower" side.

The pump device 1 according to the present embodiment is a centrifugal pump of a type called a canned pump (canned motor pump). The pump device 1 includes a motor 2; the impeller 3 rotated with power from the motor 2; and a circuit board 4 that controls the motor 2. The motor 2 is a DC brushless motor. The motor 2 includes a rotor 6 and a stator 7. The impeller 3, the rotor 6, and the stator 7 are contained in a pump case 8. The pump case 8 is composed of a motor case 9 that forms part of the motor 2; and a case body 10 secured to the lower end side of the motor case 9.

The case body 10 is provided with a suction port 10a for fluids such as water and a discharge port 10b (see FIG. 4) for fluids. Inside the pump case 8, a pump chamber 11 is formed, through which the fluid sucked through the suction port 10a passes toward the discharge port 10b. The pump chamber 11 is defined by the motor case 9 and the case body 10. A ring-like sealing member 12 for ensuring the sealing performance of the pump chamber 11 is disposed at the junction between the motor case 9 and the case body 10. The sealing member 12 is an O-ring. The motor case 9 and the case body 10 are fixed to each other with multiple screws 13.

The rotor 6 includes: a drive magnet 16 formed in a cylindrical shape; and a cylindrical magnet retaining member 17 to which the drive magnet 16 is secured. The magnet retaining member 17 formed in a cylindrical shape is disposed such that the axial direction and the vertical direction of the magnet retaining member 17 coincide with each other. The drive magnet 16 is fixed to the inner circumference of the magnet retaining member 17. The north pole and the south pole are alternately magnetized in the circumferential direction on the inner circumference of the drive magnet 16. The magnet retaining member 17 is formed of a soft magnetic material. The impeller 3 is secured to the lower end side of the magnet retaining member 17. That is, the impeller 3 is secured to the rotor 6.

The impeller 3 and the rotor 6 are disposed inside the pump chamber 11. Furthermore, the impeller 3 and the rotor 6 are rotatably supported by a fixed shaft 18. That is, the motor 2 includes the fixed shaft 18 rotatably supporting the impeller 3 and the rotor 6. The fixed shaft 18 is formed in an elongated cylindrical shape. The impeller 3 and the rotor 6 are rotated around the fixed shaft 18 as a rotation center. The fixed shaft 18 is disposed such that the axial direction and the vertical direction of the fixed shaft 18 coincide with each other. That is, the vertical direction (the Z direction) is the axial direction of the fixed shaft 18. Furthermore, the downward direction (the Z2 direction) according to the present embodiment is a first direction that is one side of the axial direction of the fixed shaft 18, and the upward direction (the Z1 direction) is a second direction that is the opposite direction of the first direction.

The impeller 3 is made of a resin. The impeller 3 includes a shaft bearing 3a through which the fixed shaft 18 is inserted. The shaft bearing 3a is formed in a cylindrical shape, and the fixed shaft 18 is inserted through the inner circumference side of the shaft bearing 3a. The lower end of the fixed shaft 18 is supported by the case body 10, and the upper end of the fixed shaft 18 is supported by the motor case 9. A thrust bearing 20 is provided between the case body 10 and the shaft bearing 3a, and the thrust bearing 21 is provided between the motor case 9 and the shaft bearing 3a. That is, the motor 2 includes the thrust bearings 20, 21 supporting the impeller 3 and the rotor 6 in the vertical direction (the axial direction of the fixed shaft 18). The thrust bearing 21 according to the present embodiment is a second thrust bearing.

The thrust bearings 20, 21 are sliding bearings formed like a flat plate. The thrust bearings 20, 21 are disposed such that the thickness direction and the vertical direction of the thrust bearings 20, 21 coincide with each other. The fixed shaft 18 is inserted through the thrust bearings 20, 21. Specifically, the thrust bearing 20 is provided with a through-hole 20a shaped like a circular hole through which the fixed shaft 18 is inserted, and the thrust bearing 21 is provided with a through-hole 21a shaped like a circular hole through which the fixed shaft 18 is inserted.

The thrust bearing 20 is disposed on the lower end side of the fixed shaft 18, and the thrust bearing 21 is disposed on the upper end side of the fixed shaft 18. The thrust bearing 21 is formed in substantially a circular-plate like shape. The outer circumference of the thrust bearing 21 is provided with a plain surface 21b to prevent rotation of the thrust bearing 21 in the circumferential direction of the rotor 6 (see FIG. 3). The specific configuration of the thrust bearing 20 is described later.

Furthermore, the impeller 3 includes: a circular-plate like blade forming portion 3b secured to the lower end of the magnet retaining member 17 to cover the lower end of the magnet retaining member 17; and a plurality of blade portions 3c protruding downward from the lower surface of the blade forming portion 3b. The lower end of the magnet retaining member 17 is attached to the outer-circumference side part of the blade forming portion 3b. As illustrated in FIG. 2, the blade forming portion 3b is provided with a plurality of through-holes 3d for air release. The through-hole 3d is a circular hole penetrating the blade forming portion 3b. The shaft bearing 3a is coupled to the center of the blade forming portion 3b. A large part of the shaft bearing 3a protrudes from the upper surface of the blade forming portion 3b. Moreover, the lower end surface of the shaft bearing 3a is located slightly lower than the lower surface of the blade forming portion 3b.

The lower end surface of the shaft bearing 3a is opposed to the thrust bearing 20, and the upper end surface of the shaft bearing 3a is opposed to the thrust bearing 21. As illustrated in FIG. 2, a communicating groove 3f communicating from the inner circumference of the shaft bearing 3a to the outer circumference thereof is formed on the lower end surface of the shaft bearing 3a. The communicating groove 3f is recessed upward from the lower end surface of the shaft bearing 3a. Furthermore, the communicating groove 3f is formed in a straight line extending in the radial direction of the rotor 6. The communicating groove 3f has a narrow width. According to the present embodiment, the two communicating grooves 3f are formed at a pitch of 180° on the lower end surface of the shaft bearing 3a.

The stator 7 is disposed on the inner circumference side of the drive magnet 16. Specifically, the motor 2 according to the present embodiment is an outer-rotor type motor in which the drive magnet 16 forming part of the rotor 6 is disposed on the outer circumference side of the stator 7. Furthermore, the stator 7 is provided on the outer circumference side of the fixed shaft 18 and the shaft bearing 3a. Moreover, the stator 7 is disposed outside the pump chamber 11. The stator 7 includes a plurality of drive coils 23 and a stator core 24. The drive coil 23 is wound around a salient-pole portion 24a of the stator core 24 through an insulator 25 that is made of an insulating material such as resin.

The circuit board 4 is a rigid board such as glass epoxy board, and it is formed in a flat-plate like shape. The circuit board 4 is disposed on the upper end side of the stator 7. Furthermore, the circuit board 4 is placed on the upper surface of a connection portion 9c, described later, forming the motor case 9. The drive coil 23 is electrically connected to the circuit board 4. The circuit board 4 and the stator core 24 are contained in the motor case 9. Moreover, the circuit board 4 and the stator 7 are covered with potting resin.

The motor case 9 is made of a resin. The motor case 9 is disposed between the stator 7 and the impeller 3 with the rotor 6, and it includes a partition wall 9a that separates the impeller 3 and the rotor 6 from the stator 7. The partition wall 9a defines part of the pump chamber 11 so that it performs a function to prevent a fluid in the pump chamber 11 from flowing into the area where the stator 7 and the circuit board 4 are installed.

The partition wall 9a includes a cylindrical outer partition wall portion 9d disposed on the outer circumference side of the stator 7 and on the inner circumference side of the drive magnet 16; and a cylindrical inner partition wall portion 9e disposed on the inner circumference side of the stator 7. The outer partition wall portion 9d and the inner partition wall portion 9e are formed in a cylindrical shape, and they are arranged in a concentric fashion around the fixed shaft 18. Furthermore, the partition wall 9a includes a circular partition wall portion 9f connecting the lower end of the outer partition wall portion 9d and the lower end of the inner partition wall portion 9e; and a bottom portion 9g covering the upper end of the inner partition wall portion 9e. Moreover, the motor case 9 includes a cylindrical outer-circumference cylindrical portion 9b that is disposed on the outer circumference side of the partition wall 9a; and the connection portion 9c connecting the partition wall 9a and the outer-circumference cylindrical portion 9b.

The case body 10 is secured to the lower end side of the outer-circumference cylindrical portion 9b. The connection portion 9c is formed in a circular shape, and it is formed like a flat plate perpendicular to a vertical direction. The connection portion 9c extends from the upper end of the outer partition wall portion 9d outward in the radial direction of the rotor 6, and it connects the upper end of the outer-circumference cylindrical portion 9b and the upper end of the outer partition wall portion 9d. On the top surface of the connection portion 9c, a plurality of projections 9h is formed to hold the circuit board 4 in position and fix it. The inner partition wall portion 9e is disposed on the outer circumference side of the fixed shaft 18 and the shaft bearing 3a. The circular partition wall portion 9f is formed in a circular shape, and it is formed like a flat plate perpendicular to a vertical direction.

The bottom portion 9f holds the upper end of the fixed shaft 18. At the center of the lower surface of the bottom portion 9f, the placement recessed portion 9j is formed, on which the thrust bearing 21 is placed. The placement recessed portion 9j is formed like substantially a circular hole that is recessed upward from the lower surface of the bottom portion 9f. The bottom surface (the upper surface) of the placement recessed portion 9j is a plane perpendicular to a vertical direction. The thrust bearing 21 is disposed between the shaft bearing 3a of the impeller 3 and the bottom surface of the placement recessed portion 9j in a vertical direction. An insertion hole 9k through which the upper end of the fixed shaft 18 is inserted is formed at the center of the bottom surface of the placement recessed portion 9j. The insertion hole 9k is formed like a circular hole that is recessed upward from the bottom surface of the placement recessed portion 9j. The bottom portion 9f according to the present embodiment is a second shaft holding portion that holds the upper end of the fixed shaft 18.

The inner diameter of the placement recessed portion 9j is slightly larger than the outer diameter of the thrust bearing 21. As illustrated in FIG. 3, a plain surface 9r opposed to the plain surface 21b of the thrust bearing 21 is formed on the side surface of the placement recessed portion 9j. According to the present embodiment, the plain surface 21b of the thrust bearing 21 and the plain surface 9r of the bottom portion 9f prevent rotation of the thrust bearing 21 in the circumferential direction of the rotor 6. The plain surface 9r according to the present embodiment is a second rotation preventing portion that prevents rotation of the thrust bearing 21 in the circumferential direction of the rotor 6.

(Configuration of Thrust Bearing and Configuration of Case body)

Figure 4:
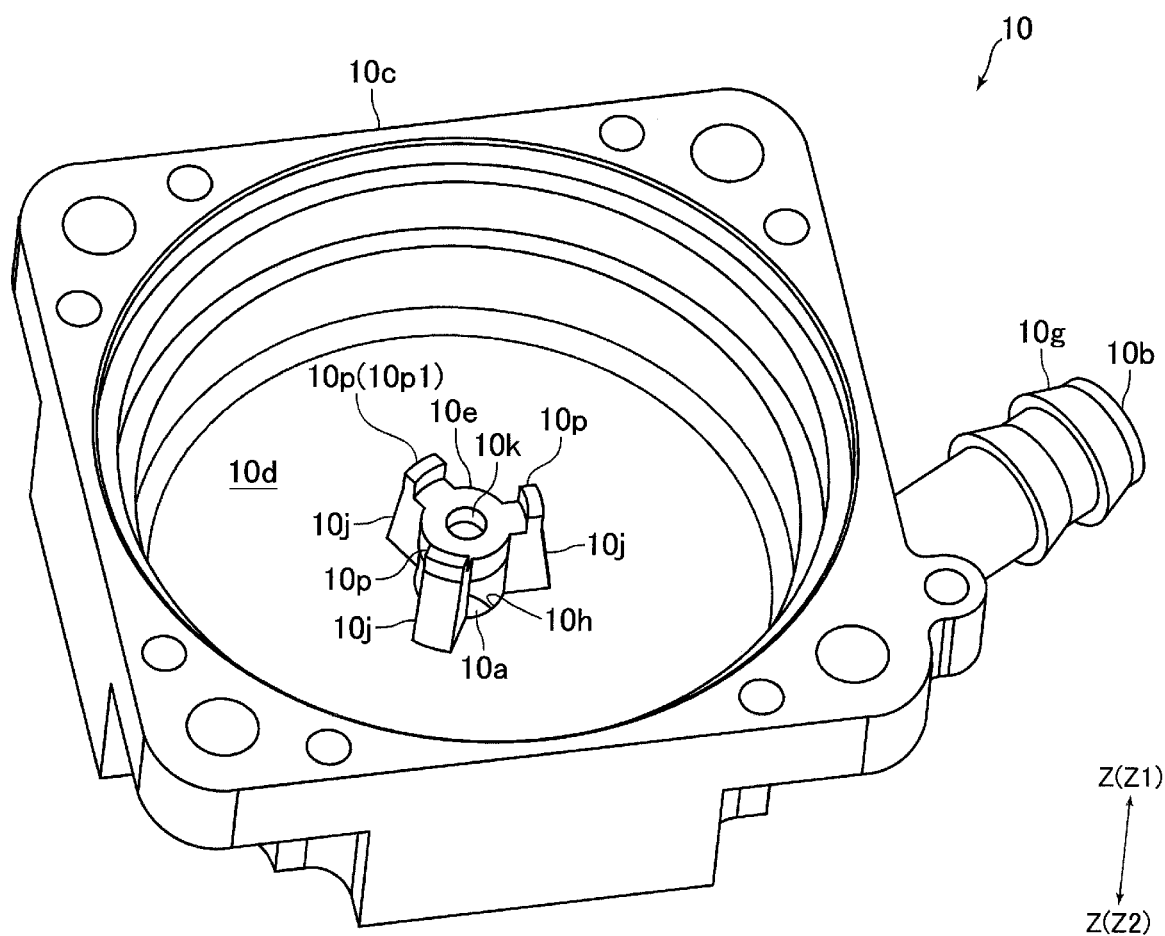
FIG. 4 is a perspective view of a case body illustrated in FIG. 1.
Figure 5:
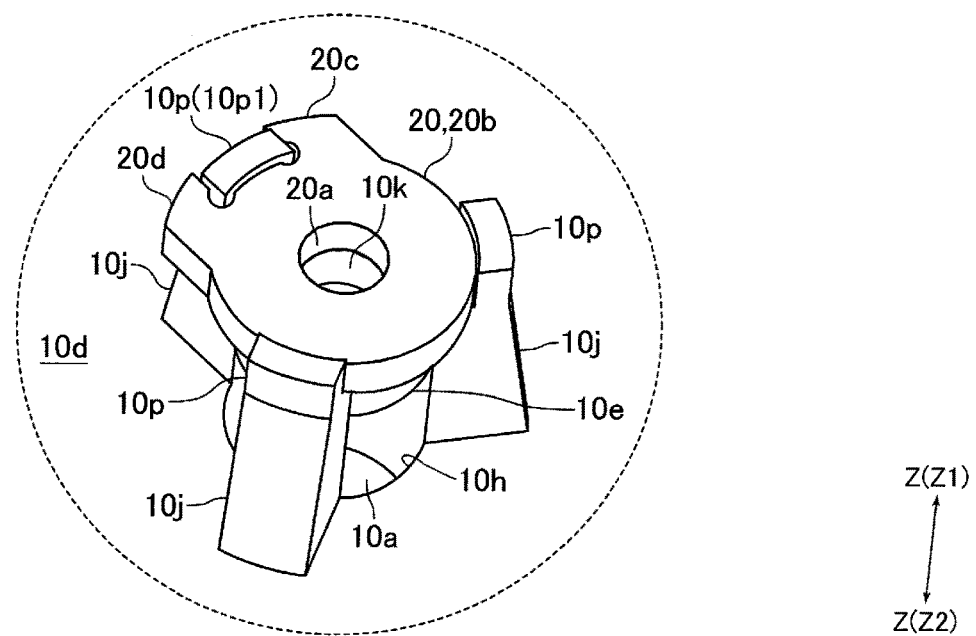
FIG. 5 is an enlarged perspective view of the state where a thrust bearing is placed on a shaft holding portion illustrated in FIG. 4.
Figure 6:
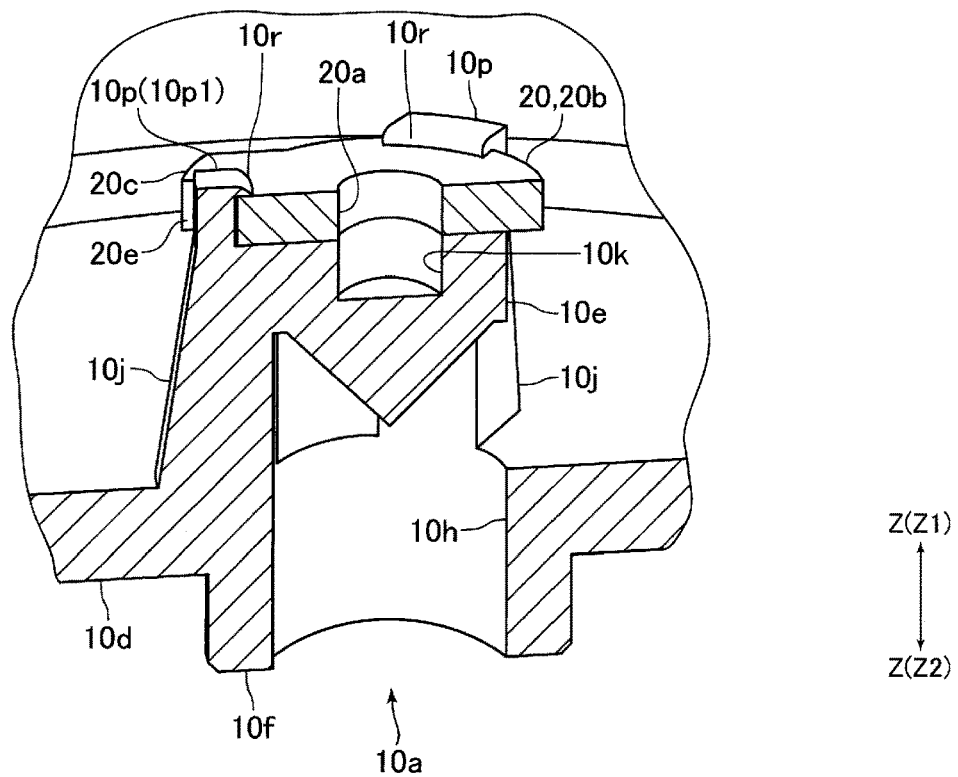
FIG. 6 is a cross-sectional view of the shaft holding portion, a connection portion, the thrust bearing, and the like, illustrated in FIG. 5.
Figure 7:
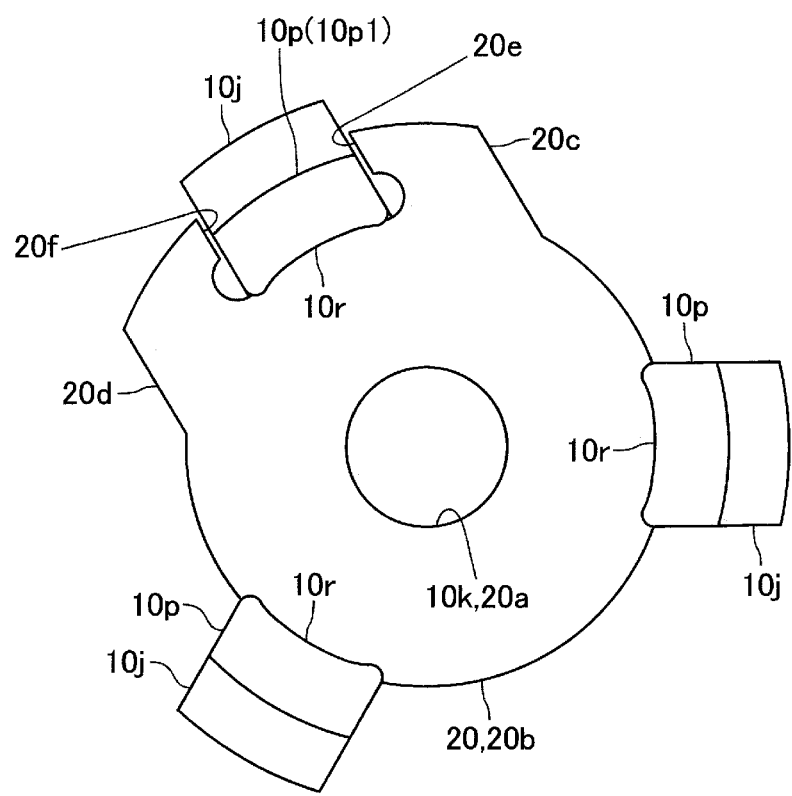
FIG. 7 is a plan view of the connection portion and the thrust bearing illustrated in FIG. 5.

FIG. 4 is a perspective view of the case body 10 illustrated in FIG. 1. FIG. 5 is an enlarged perspective view of the state where the thrust bearing 20 is placed on a shaft holding portion 10e illustrated in FIG. 4. FIG. 6 is a cross-sectional view of the shaft holding portion 10e, a connection portion 10j, the thrust bearing 20, and the like, illustrated in FIG. 5. FIG. 7 is a plan view of the connection portion 10j and the thrust bearing 20 illustrated in FIG. 5.

The case body 10 is made of a resin. The case body 10 is formed in a cylindrical shape with a bottom, including a cylindrical portion 10c formed in a cylindrical shape and a bottom portion 10d covering one end of the cylindrical portion 10c. The axial direction of the cylindrical portion 10c formed in a cylindrical shape is identical to a vertical direction. The bottom portion 10d covers the lower end of the cylindrical portion 10c. The inner circumference side of the cylindrical portion 10c and the upper side of the bottom portion 10d form the pump chamber 11. The case body 10 is provided with the shaft holding portion 10e holding the lower end of the fixed shaft 18; a cylindrical suction-port forming portion 10f with the suction port 10a formed at its end; and a cylindrical discharge-port forming portion 10g with the discharge port 10b formed at its end.

The discharge-port forming portion 10g protrudes from the outer circumference of the cylindrical portion 10c toward the outer circumference side. The suction-port forming portion 10f protrudes downward from the center of the bottom portion 10d. The axis center of the suction-port forming portion 10f formed in a cylindrical shape coincides with the axis center of the fixed shaft 18. The bottom portion 10d is provided with a through-hole 10h penetrating the bottom portion 10d in a vertical direction. The through-hole 10h is formed at the center of the bottom portion 10d.

The through-hole 10h is formed like a circular hole. When viewed in a vertical direction, the center of the through-hole 10h coincides with the axis center of the suction-port forming portion 10f. That is, when viewed in a vertical direction, the center of the through-hole 10h coincides with the axis center of the fixed shaft 18. The inner diameter of the through-hole 10h is the same as the inner diameter of the suction-port forming portion 10f. A fluid sucked through the suction port 10a passes through the inner circumference side of the suction-port forming portion 10f and the through-hole 10h.

The shaft holding portion 10e is disposed at the center of the rotor 6 in the radial direction. Furthermore, the shaft holding portion 10e is located above the bottom portion 10d. The shaft holding portion 10e is coupled to the central part of the bottom portion 10d. Specifically, the shaft holding portion 10e is coupled to the central part of the bottom portion 10d through the three connection portions 10j. That is, the case body 10 is provided with the three connection portions 10j connecting the shaft holding portion 10e and the bottom portion 10d.

The shaft holding portion 10e is composed of an upper part formed in a cylindrical shape and a lower part formed in a conical shape. The outer diameter of the lower part of the shaft holding portion 10e formed in a conical shape becomes gradually smaller toward its lower side. When viewed in a vertical direction, the center of the shaft holding portion 10e coincides with the center of the through-hole 10h. The upper end surface of the shaft holding portion 10e is a plane perpendicular to a vertical direction. An insertion hole 10k through which the lower end of the fixed shaft 18 is inserted is formed at the center of the upper end surface of the shaft holding portion 10e. The insertion hole 10k is formed like a circular hole that is recessed downward from the upper end surface of the shaft holding portion 10e. The thrust bearing 20 is placed on the upper side of the shaft holding portion 10e.

The connection portion 10j protrudes upward from the upper surface of the bottom portion 10d. Furthermore, the connection portion 10j protrudes upward from the circumferential edge of the through-hole 10h. The three connection portions 10j are provided such that they surround the through-hole 10h. Moreover, the three connection portions 10j are disposed with a space interposed therebetween in the circumferential direction of the rotor 6. The three connection portions 10j are disposed with a constant pitch in the circumferential direction of the rotor 6. Specifically, the three connection portions 10j are formed at a pitch of 120° with the through-hole 10h as a center. The three connection portions 10j are formed to have the same shape.

The inner surface of the connection portion 10j in the radial direction of the rotor 6 is a recessed curved surface. When viewed in a vertical direction, the shape of the inner surface of the connection portion 10j in the radial direction of the rotor 6 is a circular shape with the center of the through-hole 10h as a center of curvature. The radius of curvature of the inner surface of the connection portion 10j in the radial direction of the rotor 6 is the same as the radius of curvature of the through-hole 10h, and the inner surface of the connection portion 10j in the radial direction of the rotor 6 smoothly connects to the inner circumference of the through-hole 10h. After passing through the through-hole 10h, a fluid passes between the three connection portions 10j in the circumferential direction of the rotor 6 and flows into the pump chamber 11.

The shaft holding portion 10e is coupled to the upper ends of the three connection portions 10j. Specifically, the outer circumference of the upper part of the shaft holding portion 10e formed in a cylindrical shape is coupled to the upper ends of the three connection portions 10j. The upper end side of the three connection portions 10j is provided with a protrusion 10p protruding upward beyond the upper end surface of the shaft holding portion 10e. The height of the protrusion 10p (specifically, the height from the upper end surface of the shaft holding portion 10e to the upper end surface of the protrusion 10p) is more than the thickness of the thrust bearing 20. The protrusion 10p is formed like a curved plate. When viewed in a vertical direction, the center of curvature of the inner surface of the protrusion 10p in the radial direction of the rotor 6 and the center of curvature of the outer surface of the protrusion 10p in the radial direction of the rotor 6 coincide with the center of the through-hole 10h. The end surface of the protrusion 10p in the circumferential direction of the rotor 6 is a plain surface parallel to a vertical direction.

As described above, the thrust bearing 20 is formed like a flat plate. The thrust bearing 20 is composed of a circular plate portion 20b formed like a circular plate and two projections 20c, 20d projecting from the circular plate portion 20b toward the outer circumference side of the thrust bearing 20. That is, the thrust bearing 20 is provided with the two projections 20c, 20d projecting toward the outer circumference side of the thrust bearing 20. The through-hole 20a is formed at the center of the circular plate portion 20b. The radius of curvature of the circular plate portion 20b is slightly smaller than the radius of curvature of the inner surface of the protrusion 10p in the radial direction of the rotor 6.

The two projections 20c, 20d are formed with a space interposed therebetween in the circumferential direction of the rotor 6. The space between the two projections 20c, 20d in the circumferential direction of the rotor 6 is slightly wider than the width of the protrusion 10p in the circumferential direction of the rotor 6. The circular plate portion 20b is located on the inner side of the three protrusions 10p in the radial direction of the rotor 6. That is, part of the thrust bearing 20 is located on the inner side of the three protrusions 10p in the radial direction of the rotor 6. The single protrusion 10p among the three protrusions 10p is sandwiched between the projection 20c and the projection 20d in the circumferential direction of the rotor 6. In the following explanation, to separately describe the single protrusion 10p sandwiched between the projection 20c and the projection 20d from the two remaining protrusions 10p, the single protrusion 10p is referred to as a "protrusion 10p1".

The projection 20c at the side of the protrusion 10p1 in the circumferential direction of the rotor 6 is provided with a plain surface parallel to a vertical direction. The plain surface is opposed to one end surface of the protrusion 10p1 in the circumferential direction, and it is a contact surface 20e that may be in contact with the one end surface of the protrusion 10p1 in the circumferential direction of the rotor 6. That is, the projection 20c is provided with the contact surface 20e that may be in contact with the protrusion 10p1 at one side in the circumferential direction of the rotor 6.

Furthermore, the projection 20d at the side of the protrusion 10p1 in the circumferential direction of the rotor 6 is provided with a plain surface parallel to a vertical direction. The plain surface is opposed to the other end surface of the protrusion 10p1 in the circumferential direction of the rotor 6, and it is a contact surface 20f that may be in contact with the other end surface of the protrusion 10p1 in the circumferential direction of the rotor 6. That is, the projection 20d is provided with the contact surface 20f that may be in contact with the protrusion 10p1 at the other side in the circumferential direction of the rotor 6.

According to the present embodiment, the projections 20c, 20d and the protrusion 10p1 prevent rotation of the thrust bearing 20 in the circumferential direction of the rotor 6. The protrusion 10p1 according to the present embodiment is a rotation preventing portion that prevents rotation of the thrust bearing 20 in the circumferential direction of the rotor 6. That is, the single protrusion 10p1 among the three protrusions 10p is a rotation preventing portion that prevents rotation of the thrust bearing 20 in the circumferential direction of the rotor 6. Moreover, the projection 20c according to the present embodiment is a first projection, the projection 20d is a second projection, the contact surface 20e is a first contact surface, and the contact surface 20f is a second contact surface.

The thrust bearing 20 is disposed between the shaft bearing 3a of the impeller 3 and the upper end surface of the shaft holding portion 10e in a vertical direction. A clearance (thrust looseness) is formed in at least any one of the gaps between the thrust bearing 20 and the shaft bearing 3a and between the thrust bearing 21 and the shaft bearing 3a. Furthermore, when the pump device 1 is driven, the thrust bearing 20 and the shaft bearing 3a are brought into contact with each other, and a thrust looseness is formed between the thrust bearing 21 and the shaft bearing 3a.

Removal preventing portions 10r that prevent removal of the thrust bearing 20 to the upper side are formed at the upper end side of the three protrusions 10p (see FIG. 6, FIG. 7). Specifically, the removal preventing portions 10r are formed at the upper end of the three protrusions 10p to prevent the circular plate portion 20b provided on the inner side of the three protrusions 10p in the radial direction of the rotor 6 from being removed above. The removal preventing portion 10r is formed at the inner side end of the upper end of the protrusion 10p in the radial direction of the rotor 6.

The removal preventing portion 10r according to the present embodiment is formed such that, after the thrust bearing 20 is placed on the top of the shaft holding portion 10e, the upper end of the protrusion 10p of the case body 10 made of resin is melted so that part of the upper end of the protrusion 10p covers the top of the circular plate portion 20b. For example, the removal preventing portion 10r is formed by an ultrasonic welder. The removal preventing portion 10r may be formed by using other methods. Illustration of the removal preventing portion 10r is omitted from FIG. 5.

(Primary Advantage of the Present Embodiment)

As described above, according to the present embodiment, the protrusion 10p1 formed in the case body 10 and the projections 20c, 20d formed in the thrust bearing 20 prevent rotation of the thrust bearing 20 in the circumferential direction of the rotor 6. Therefore, according to the present embodiment, rotation of the thrust bearing 20 is preventable even without D-cut processing performed on the lower end side of the fixed shaft 18. Furthermore, according to the present embodiment, as the plain surface 9r formed on the bottom portion 9f of the motor case 9 and the plain surface 21b formed on the thrust bearing 21 prevent rotation of the thrust bearing 21 in the circumferential direction of the rotor 6, rotation of the thrust bearing 21 is preventable even without D-cut processing performed on the upper end side of the fixed shaft 18.

That is, according to the present embodiment, rotation of the thrust bearings 20, 21 is preventable even without D-cut processing performed on the fixed shaft 18. Therefore, according to the present embodiment, costs of the fixed shaft 18 may be reduced while corotation of the thrust bearings 20, 21 in accordance with rotation of the rotor 6 is preventable. Moreover, as the pump device 1 according to the present embodiment uses the fixed shaft 18 that is formed in a simple elongated cylindrical shape without D-cut processing performed thereon, it is possible to prevent improper assemby, such as improper direction of the fixed shaft 18 attached, during assembly of the pump device 1.

According to the present embodiment, as the use of the connection portion 10j connecting the shaft holding portion 10e and the bottom portion 10d prevents corotation of the thrust bearing 20 in accordance with rotation of the rotor 6, it is not necessary to provide a separate member to prevent corotation of the thrust bearing 20. Furthermore, according to the present embodiment, as the use of the bottom portion 9f holding the upper end of the fixed shaft 18 prevents corotation of the thrust bearing 21 in accordance with rotation of the rotor 6, it is not necessary to provide a separate member to prevent corotation of the thrust bearing 21. Thus, according to the present embodiment, the configuration of the pump device 1 may be simplified.

According to the present embodiment, the thrust bearing 20 is provided with the two projections 20c, 20d that project toward the outer circumference side of the thrust bearing 20. Therefore, according to the present embodiment, during assembly of the pump device 1, the thrust bearing 20 may be easily assembled on the upper side of the shaft holding portion 10e by using the projections 20c, 20d as marks.

According to the present embodiment, the removal preventing portions 10r are formed on the upper end side of the three protrusions 10p to prevent the thrust bearing 20 from being removed above. Therefore, according to the present embodiment, it is possible to prevent the thrust bearing 20 secured to the case body 10 from being removed from the case body 10. Therefore, according to the present embodiment, the thrust bearing 20 may be easily handled during assembly of the pump device 1. Moreover, according to the present embodiment, as it is ensured that the thrust bearing 20 is installed on the upper side of the shaft holding portion 10e during assembly of the pump device 1, it is possible to prevent improper assembly such as not installing the thrust bearing 20 on the upper side of the shaft holding portion 10e when the pump device 1 is completed.

According to the present embodiment, the communicating groove 3f communicating from the inner circumference of the shaft bearing 3a to the outer circumference thereof is formed on the lower end surface of the shaft bearing 3a. Therefore, according to the present embodiment, when the impeller 3 is rotated, a fluid flows due to a centrifugal force through the communicating groove 3f from the inner circumference of the shaft bearing 3a toward the outer circumference thereof. Therefore, according to the present embodiment, the use of a small gap formed between the outer circumference of the fixed shaft 18 and the inner circumference of the shaft bearing 3a and the communicating groove 3f formed on the lower end surface of the shaft bearing 3a allows a fluid flow path to be formed between the upper end side of the fixed shaft 18 and the lower end side thereof. As a result, according to the present embodiment, a fluid membrane may be formed between the outer circumference of the fixed shaft 18 and the inner circumference of the shaft bearing 3a. Thus, the present embodiment may reduce abrasion to the fixed shaft 18 and abrasion to the inner circumference of the shaft bearing 3a.

Furthermore, according to the present embodiment, as a fluid flows due to a centrifugal force through the communicating groove 3f from the inner circumference of the shaft bearing 3a toward the outer circumference thereof, a fluid membrane may be formed between the lower end surface of the shaft bearing 3a and the thrust bearing 20. Thus, the present embodiment may reduce abrasion to the lower end surface of the shaft bearing 3a and abrasion to the thrust bearing 20.

(Modification 1 of the Thrust Bearing)

FIGS. 8A to 8D are plan views that illustrate the configuration of the thrust bearing 20 according to another embodiment of the present disclosure. Here, in FIGS. 8A to 8D, the same component as that in the above-described embodiment is attached with the same reference numeral.

Figure 8A:
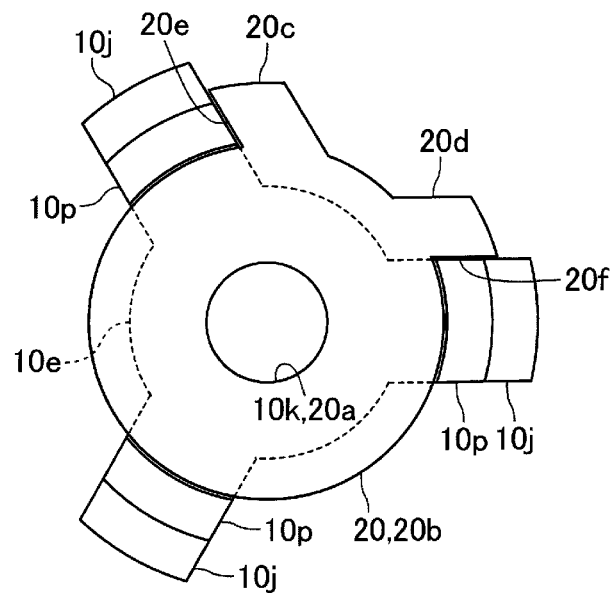
FIGS. 8A to 8D are plan views that illustrate the configuration of the thrust bearing according to another embodiment of the present disclosure.
Figure 8B:
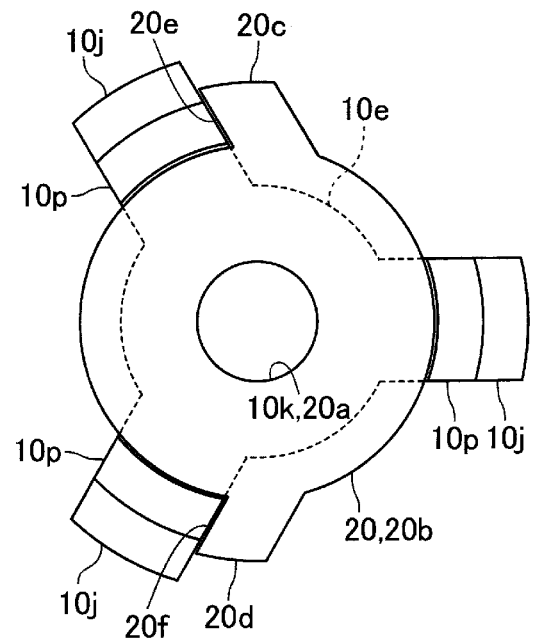

According to the above-described embodiment, the projections 20c, 20d are formed such that the contact surface 20e of the projection 20c and the contact surface 20f of the projection 20d may be in contact with the same protrusion 10p1; however, as illustrated in FIGS. 8A and 8B, the protrusion 10p that may be in contact with the contact surface 20e of the projection 20c may be different from the protrusion 10p that may be in contact with the contact surface 20f of the projection 20d. In this case, the two protrusions 10p, i.e., the protrusion 10p that may be in contact with the contact surface 20e and the protrusion 10p that may be in contact with the contact surface 20f, are rotation preventing portions that prevent rotation of the thrust bearing 20 in the circumferential direction of the rotor 6.

Figure 8C:
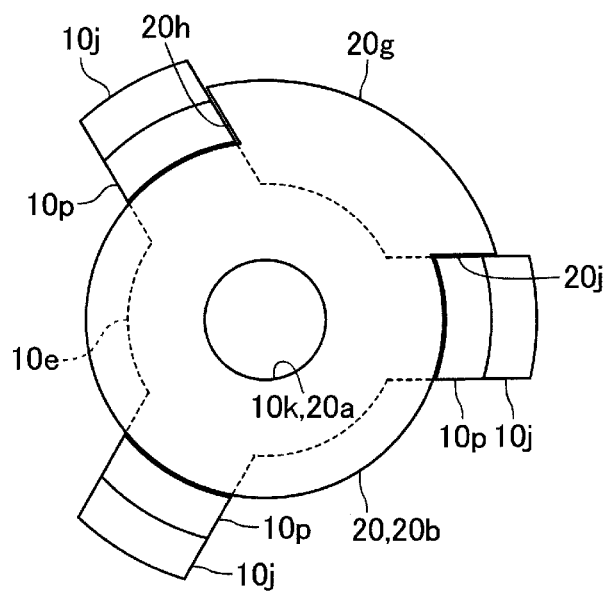

Furthermore, as illustrated in FIG. 8C, instead of the projections 20c, 20d, a single projection 20g may be formed on the thrust bearing 20. In this case, the protrusion 10p that may be in contact with an end surface 20h of the projection 20g at one end in the circumferential direction of the rotor 6 is different from the protrusion 10p that may be in contact with an end surface 20j of the projection 20g at the other end in the circumferential direction of the rotor 6. In this case, the two protrusions 10p, i.e., the protrusion 10p that may be in contact with the end surface 20h and the protrusion 10p that may be in contact with the end surface 20j, are rotation preventing portions that prevent rotation of the thrust bearing 20 in the circumferential direction of the rotor 6.

Figure 8D:
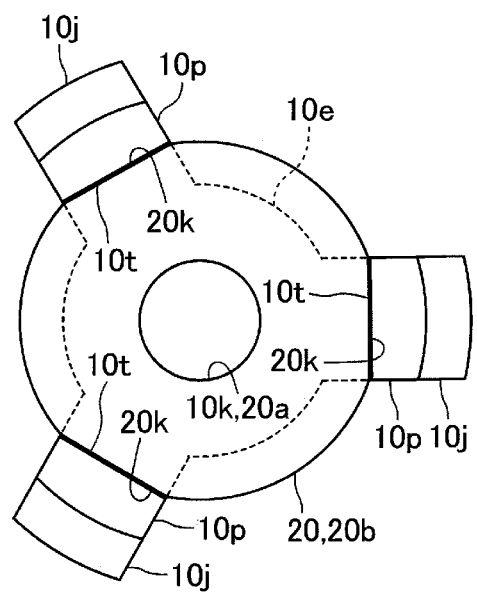

Furthermore, according to the above-described embodiment, the projections 20c, 20d do not need to be formed on the thrust bearing 20. In this case, as illustrated in FIG. 8D, for example, three plain surfaces 20k are formed on the outer circumference of the thrust bearing 20 to prevent rotation of the thrust bearing 20 in the circumferential direction of the rotor 6. Moreover, in this case, the inner surface of the protrusion 10p in the radial direction of the rotor 6 is a plain surface 10t opposed to the plain surface 20k. In this case, the plain surface 20k and the plain surface 10t prevent rotation of the thrust bearing 20 in the circumferential direction of the rotor 6. Moreover, in this case, the three protrusions 10p are rotation preventing portions that prevent rotation of the thrust bearing 20 in the circumferential direction of the rotor 6.

Furthermore, according to the modification illustrated in FIG. 8D, the number of the plain surfaces 20k formed on the thrust bearing 20 and the number of the plain surfaces 10t opposed to the plain surfaces 20k may be one or two. When the number of the plain surfaces 20k and the number of the plain surfaces 10t are two, the two protrusions 10p are rotation preventing portions that prevent rotation of the thrust bearing 20 in the circumferential direction of the rotor 6. Moreover, when the number of the plain surfaces 20k and the number of the plain surfaces 10t are one, the single protrusion 10p is a rotation preventing portion that prevents rotation of the thrust bearing 20 in the circumferential direction of the rotor 6. Illustration of the removal preventing portion 10r is omitted from FIGS. 8A to 8D.

(Modification 2 of the Thrust Bearing)

Figure 9:
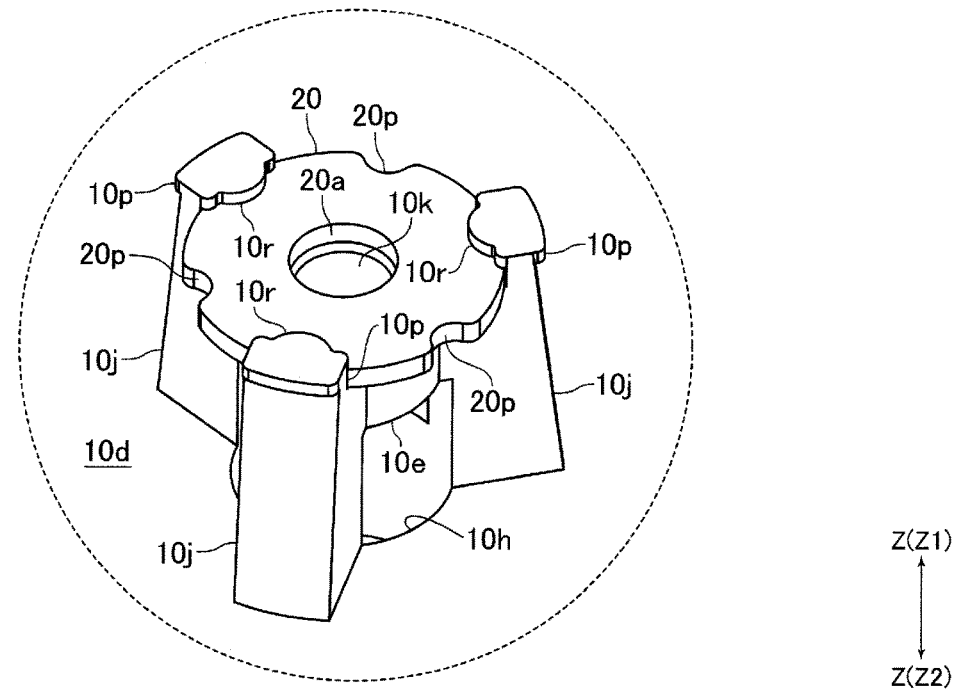
FIG. 9 is an enlarged perspective view that illustrates the configurations of the thrust bearing and a protrusion according to another embodiment of the present disclosure.
Figure 10:
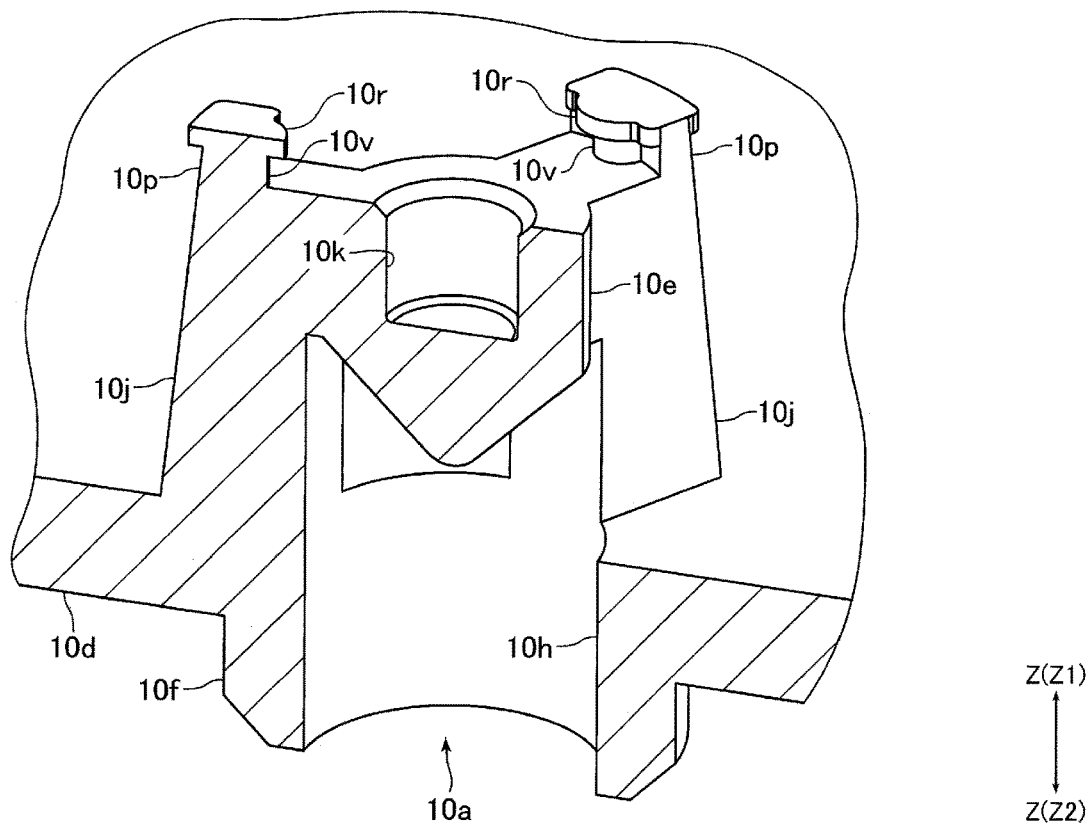
FIG. 10 is a cross-sectional view that illustrates the configuration of the protrusion illustrated in FIG. 9.
Figure 11A:
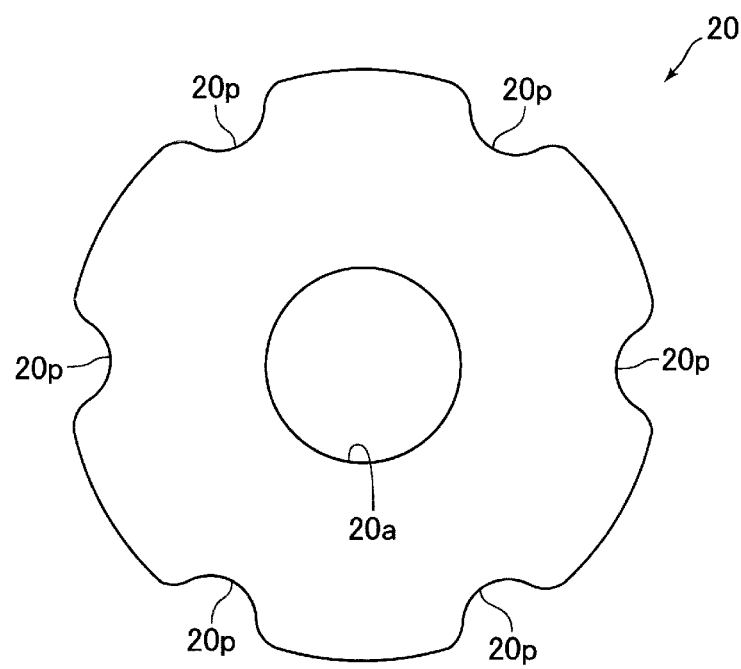
FIG. 11A is a plan view of the thrust bearing illustrated in FIG. 9.
Figure 11B:
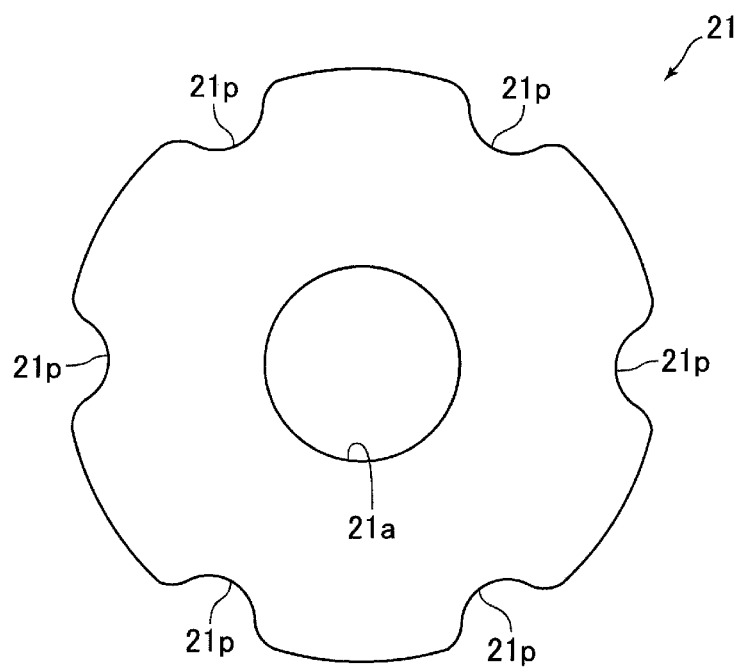
FIG. 11B is a plan view of the second thrust bearing according to another embodiment of the present disclosure.
Figure 12:
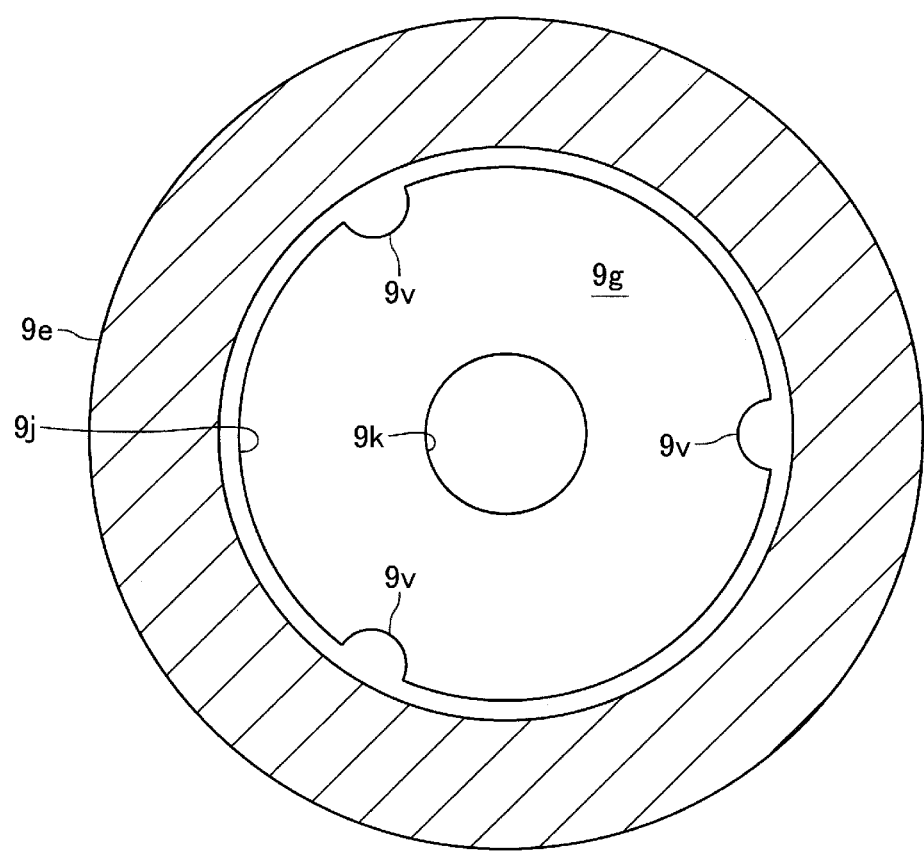
FIG. 12 is a diagram that illustrates the configuration of a placement recessed portion according to another embodiment of the present disclosure in the E-E direction of FIG. 1.

FIG. 9 is an enlarged perspective view that illustrates the configurations of the thrust bearing 20 and the protrusion 10p according to another embodiment of the present disclosure. FIG. 10 is a cross-sectional view that illustrates the configuration of the protrusion 10p illustrated in FIG. 9. FIG. 11A is a plan view of the thrust bearing 20 illustrated in FIG. 9, and FIG. 11B is a plan view of the thrust bearing 21 according to another embodiment of the present disclosure. FIG. 12 is a diagram that illustrates the configuration of the placement recessed portion 9j according to another embodiment of the present disclosure in the E-E direction of FIG. 1. Furthermore, in FIG. 9 to FIG. 12, the same component as that in the above-described embodiment is attached with the same reference numeral.

According to the above-described embodiment, when the thrust bearing 20 is not provided with the projections 20c, 20d, for example, engagement protruding portions 10v (see FIG. 10) bulging toward the inner side in the radial direction of the rotor 6 may be formed on the three protrusions 10p. In this case, the thrust bearing 20 is provided with engagement recessed portions 20p that are engaged with the engagement protruding portions 10v to prevent rotation of the thrust bearing 20 in the circumferential direction of the rotor 6 (see FIG. 11A). In this case, the three protrusions 10p are rotation preventing portions that prevent rotation of the thrust bearing 20 in the circumferential direction of the rotor 6. That is, the rotation preventing portion is provided with the engagement protruding portions 10v.

The engagement protruding portion 10v is formed on the inner surface of the protrusion 10p in the radial direction of the rotor 6. Furthermore, the engagement protruding portion 10v is formed like substantially a semicircular column. The engagement recessed portion 20p is recessed toward the inner side in the radial direction of the thrust bearing 20. When viewed in a vertical direction, the engagement recessed portion 20p is formed in a circular shape. Furthermore, the engagement recessed portions 20p are formed at six areas with a pitch of the equal angle with respect to the axis center of the fixed shaft 18. That is, the thrust bearing 20 is provided with the six engagement recessed portions 20p that are arranged with a pitch of 60° with respect to the axis center of the fixed shaft 18.

Furthermore, in this case, as illustrated in FIG. 12, for example, the side surface of the placement recessed portion 9j of the motor case 9 is provided with engagement protruding portions 9v serving as a second engagement protruding portion that bulges toward the inner side in the radial direction of the rotor 6. The thrust bearing 21 is formed in the same shape as that of the thrust bearing 20, and the thrust bearing 21 is provided with engagement recessed portions 21p serving as a second engagement recessed portion that is engaged with the engagement protruding portion 9v to prevent rotation of the thrust bearing 21 in the circumferential direction of the rotor 6 (see FIG. 11B).

The engagement protruding portion 9v is formed like substantially a semicircular column. The engagement protruding portions 9v are formed at three areas with a pitch of the equal angle with respect to the axis center of the fixed shaft 18. That is, the side surface of the placement recessed portion 9j is provided with the three engagement protruding portions 9v that are arranged with a pitch of 120° with respect to the axis center of the fixed shaft 18. The engagement recessed portion 21p is recessed toward the inner side in the radial direction of the thrust bearing 21. When viewed in a vertical direction, the engagement recessed portion 21p is formed in a circular shape. Furthermore, the engagement recessed portions 21p are formed at six areas with a pitch of the equal angle with respect to the axis center of the fixed shaft 18. That is, the thrust bearing 21 is provided with the six engagement recessed portions 21p that are arranged with a pitch of 60° with respect to the axis center of the fixed shaft 18.

According to the present modification, as the thrust bearing 21 is formed to have the same shape as that of the thrust bearing 20, the costs of the pump device 1 may be reduced. Furthermore, according to the present modification, as the projections 20c, 20d are not formed on the thrust bearing 20, the flow of a fluid in the pump chamber 11 is not changed due to effects of the projections 20c, 20d.

Furthermore, according to the present modification, as the engagement protruding portions 9v are formed at three areas with a pitch of the equal angle with respect to the axis center of the fixed shaft 18, the entire thrust bearing 21 is located lower than its placement position in design when the engagement recessed portion 21p is not engaged with the engagement protruding portion 9v. Therefore, when the engagement recessed portion 21p is not engaged with the engagement protruding portion 9v, the gap between the thrust bearings 20, 21 and the shaft bearing 3a in a vertical direction is small. Thus, the rotational load of the rotor 6 may be high when the engagement recessed portion 21p is not engaged with the engagement protruding portion 9v and, as a result, the pump device 1 with the thrust bearing 21 installed at an improper position may be found during examination after the pump device 1 is assembled. Furthermore, when the engagement protruding portion 9v is formed at one area, for example, the thrust bearing 21 is arranged in a tilted state due to disengagement between the engagement protruding portion 9v and the engagement recessed portion 21p; thus, even when the engagement recessed portion 21p is not engaged with the engagement protruding portion 9v, the rotational load of the rotor 6 is less likely to be high.

Furthermore, according to the present modification, as the engagement protruding portions 9v are formed at three areas with a pitch of the equal angle with respect to the axis center of the fixed shaft 18 and the engagement recessed portions 21p are formed at six areas with a pitch of the equal angle with respect to the axis center of the fixed shaft 18, the engagement recessed portion 21p is easily engaged with the engagement protruding portion 9v when the thrust bearing 21 is installed in the placement recessed portion 9j. Thus, even though the placement recessed portion 9j is formed in the bottom portion 9f covering the upper end of the inner partition wall portion 9e, the engagement recessed portion 21p may be easily engaged with the engagement protruding portion 9v.

Furthermore, according to the present modification, the thrust bearing 20 and the thrust bearing 21 do not need to be formed to have the same shape. Furthermore, according to the present modification, the engagement protruding portion 10v may be formed on the one or two protrusions 10p. Furthermore, the number of the engagement recessed portions 20p formed in the thrust bearing 20 may be equal to or less than five or equal to or more than seven. Moreover, the engagement recessed portions 20p do not need to be formed with a pitch of the equal angle with respect to the axis center of the fixed shaft 18.

Furthermore, the number of the engagement recessed portions 21p formed in the thrust bearing 21 may be equal to or less than five or equal to or more than seven. For example, the engagement recessed portions 21p may be formed at nine areas with a pitch of the equal angle with respect to the axis center of the fixed shaft 18. Even in this case, the engagement recessed portion 21p is easily engaged with the engagement protruding portion 9v when the thrust bearing 21 is installed in the placement recessed portion 9j. Furthermore, the engagement recessed portions 21p do not need to be formed with a pitch of the equal angle with respect to the axis center of the fixed shaft 18.

Furthermore, the number of the engagement protruding portions 9v formed on the side surface of the placement recessed portion 9j may be one or two or equal to or more than four in accordance with the number of the engagement recessed portions 21p. When the engagement protruding portions 9v are formed at equal to or more than four areas, the entire thrust bearing 21 is located lower than its placement position in design due to disengagement between the engagement recessed portion 21p and the engagement protruding portion 9v; thus, the pump device 1 with the thrust bearing 21 installed at an improper position may be found during examination after the pump device 1 is assembled.

Another Embodiment

As the above-described embodiment is an example of preferred embodiments according to the present disclosure, this is not a limitation, and various modifications may be made without changing the scope of the present disclosure.

According to the above-described embodiment, the number of the connection portions 10j formed in the case body 10 may be two. Furthermore, the number of the connection portions 10j formed in the case body 10 may be equal to or more than four. When the number of the connection portions 10j is equal to or more than four, the protrusions 10p may be formed on the upper end sides of all the connection portions 10j, or the protrusion 10p may not be formed on the upper end side of some of the connection portions 10j. However, even when the protrusion 10p is not formed on the upper end side of some of the connection portions 10j, the protrusions 10p are formed on the upper end sides of at least two of the connection portions 10j.

According to the above-described embodiment, the removal preventing portion 10r is formed by melting the upper end of the protrusion 10p; however, the removal preventing portion 10r enabling snap-fit engagement with the upper surface of the thrust bearing 20 may be previously formed on the upper end side of the protrusion 10p. Furthermore, according to the above-described embodiment, the removal preventing portion 10r may be formed on the upper end sides of only the two protrusions 10p among the three protrusions 10p if it is possible to prevent the thrust bearing 20 from being removed above. Furthermore, according to the above-described embodiment, the removal preventing portion 10r does not need to be formed on the upper end side of the protrusion 10p. In this case, the height of the protrusion 10p may be less than the thickness of the thrust bearing 20. Moreover, in this case, the thrust bearing 20 may be pressed into the inner side of the three protrusions 10p in the radial direction of the rotor 6 to prevent the thrust bearing 20 from being removed above.

According to the above-described embodiment, D-cut processing may be performed on the upper end side of the fixed shaft 18. That is, a D-cut surface may be formed on the upper end side of the fixed shaft 18. In this case, the through-hole 21a of the thrust bearing 21 is provided with a plain surface opposed to the D-cut surface of the fixed shaft 18. Even in this case, as D-cut processing is not performed on the lower end side of the fixed shaft 18, costs of the fixed shaft 18 may be reduced. Moreover, according to the above-described embodiment, the motor 2 may be an inner-rotor type motor.

What is claimed is:

1. A pump device, comprising:
a motor, having a rotor and a stator; and
an impeller, fixed to the rotor and configured to be rotated by a power of the motor, wherein
a pump chamber through which a fluid sucked from a suction port passes toward a discharge port is provided inside a pump case, and the rotor, the stator and the impeller are housed in the pump case,
the motor includes:
   a fixed shaft, extending in a first direction towards the suction port, and rotatably supporting the rotor and the impeller; and
   a thrust bearing, when one side in an axial direction of the fixed shaft is the first direction and a direction opposite to the first direction is a second direction, the thrust bearing is disposed on an end side of the fixed shaft in the first direction to have the fixed shaft inserted therethrough, and the thrust bearing supports the rotor and the impeller in the axial direction of the fixed shaft,
the pump case includes: a case body provided with the suction port,
the case body is formed in a cylindrical shape with a bottom, and the case body including: a cylindrical portion formed in a cylindrical shape and a bottom portion covering one end of the cylindrical portion,
an axial direction of the cylindrical portion formed in a cylindrical shape coincides with the axial direction of the fixed shaft,
the bottom portion covers an end of the cylindrical portion in the first direction,
the bottom portion is provided with a through-hole penetrating the bottom portion in the axial direction of the fixed shaft and allowing passage of the fluid sucked through the suction port,
an axis center of the fixed shaft coincides with a center of the through-hole when viewed in the axial direction of the fixed shaft,
the case body is provided with a shaft holding portion disposed at a side of the bottom portion in the second direction to hold an end of the fixed shaft in the first direction and a plurality of connection portions disposed with a space interposed therebetween in a circumferential direction of the rotor to surround the through-hole and connects the shaft holding portion and the bottom portion,
after passing through the through-hole, the fluid flows into the pump chamber between the connection portions in the circumferential direction of the rotor,
end sides in the second direction of at least two of the connection portions are each provided with a respective protrusion that protrudes in the second direction beyond an end surface of the shaft holding portion at a side in the second direction,
the thrust bearing is disposed at a side of the shaft holding portion in the second direction, and at least part of the thrust bearing is located inside the protrusion in a radial direction of the rotor, and
a first one of the protrusions has a rotation preventing portion that prevents rotation of the thrust bearing in the circumferential direction of the rotor,
wherein
the rotation preventing portion is provided with an engagement protruding portion that bulges toward an inner side in the radial direction of the rotor, and
the thrust bearing is provided with an engagement recessed portion that is engaged with the engagement protruding portion to prevent rotation of the thrust bearing in the circumferential direction of the rotor,
the engagement protruding portion is a substantially semi-circular column,
the engagement recessed portion is a circular shape wherein an end side in the second direction of the first one of the protrusions is provided with a removal preventing portion that prevents the thrust bearing from being removed to a side in the second direction, and wherein the removal preventing portion is monolithic with the first one of the protrusions.

2. The pump device according to claim 1, wherein
the thrust bearing is provided with a first projection and a second projection projecting toward an outer circumference side of the thrust bearing,
   the first projection is provided with a first contact surface that is capable of being in contact with the rotation preventing portion at one side in the circumferential direction of the rotor, and
   the second projection is provided with a second contact surface that is capable of being in contact with the rotation preventing portion at other side in the circumferential direction of the rotor.

3. The pump device according to claim 2, wherein
one of the protrusions is the rotation preventing portion, and
the rotation preventing portion is sandwiched between the first projection and the second projection in the circumferential direction of the rotor.

4. The pump device according to claim 1, wherein
an end side of at least one of the protrusions in the second direction is provided with a removal preventing portion that prevents the thrust bearing from being removed to a side in the second direction.

5. The pump device according to claim 1, wherein
the motor includes: a second thrust bearing, disposed on an end side of the fixed shaft in the second direction to have the fixed shaft inserted therethrough, and the second thrust bearing supports the rotor and the impeller in the axial direction of the fixed shaft,
the pump case includes: a motor case that forms part of the motor,
the motor case is provided with a second shaft holding portion that holds an end of the fixed shaft in the second direction, and the second shaft holding portion is provided with a second rotation preventing portion that prevents rotation of the second thrust bearing in the circumferential direction of the rotor.

6. The pump device according to claim 1, wherein the impeller includes: a shaft bearing with a cylindrical shape through which the fixed shaft is inserted, an end surface of the shaft bearing at a side in the first direction is opposed to the thrust bearing, and the end surface of the shaft bearing at the side in the first direction is provided with a communicating groove that communicates from an inner circumference of the shaft bearing to an outer circumference thereof and is recessed toward a side in the second direction.

7. The pump device according to claim 1, wherein the motor includes: a second thrust bearing, disposed on an end side of the fixed shaft in the second direction to have the fixed shaft inserted therethrough, and the second thrust bearing supports the rotor and the impeller in the axial direction of the fixed shaft, the pump case includes: a motor case that forms part of the motor, the motor case is provided with a second shaft holding portion that holds an end of the fixed shaft in the second direction, the second shaft holding portion is provided with a placement recessed portion that is recessed toward a side in the second direction and has the second thrust bearing placed therein, a side surface of the placement recessed portion is provided with a second engagement protruding portion that bulges toward an inner side in the radial direction of the rotor, the second thrust bearing is formed to have a shape identical to a shape of the thrust bearing, and the second thrust bearing is provided with a second engagement recessed portion that is engaged with the second engagement protruding portion to prevent rotation of the second thrust bearing in the circumferential direction of the rotor.

8. The pump device according to claim 7, wherein the second engagement protruding portions are formed at equal to or more than three areas at a pitch of an equal angle with respect to an axis center of the fixed shaft.

9. The pump device according to claim 8, wherein the second engagement protruding portions are formed at three areas with a pitch of an equal angle with respect to the axis center of the fixed shaft, and the second engagement recessed portions are formed at six or nine areas with a pitch of an equal angle with respect to the axis center of the fixed shaft.

* * * * *